(12) United States Patent
Airoldi (10) Patent No.: US 11,073,136 B2
(45) Date of Patent: Jul. 27, 2021

(54) COOLING ARRANGEMENT (71) Applicant: SIEMENS GAMESA RENEWABLE ENERGY A/S, Brande (DK)

(72) Inventor: Giovanni Airoldi, Eindhoven (NL)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 3 days.

(21) Appl. No.: 16/482,095

(22) PCT Filed: Jan. 10, 2018

(86) PCT No.: PCT/EP2018/050526
§ 371 (c)(1),
(2) Date: Jul. 30, 2019

(87) PCT Pub. No.: WO2018/141514
PCT Pub. Date: Aug. 9, 2018

(65) Prior Publication Data
US 2020/0116133 A1 Apr. 16, 2020

(30) Foreign Application Priority Data
Feb. 2, 2017 (DE) .................. 10 2017 201 641.8

(51) Int. Cl.
H02K 7/18 (2006.01)
H02K 9/06 (2006.01)
(Continued)

(52) U.S. Cl.
CPC .............. F03D 80/60 (2016.05); F03D 9/25 (2016.05); H02K 7/1838 (2013.01); H02K 9/06 (2013.01)

(58) Field of Classification Search
CPC ........... H02K 9/19; H02K 7/183; H02K 21/22
(Continued)

(56) References Cited

U.S. PATENT DOCUMENTS

2010/0102652 A1 4/2010 Booth et al.
2010/0102655 A1* 4/2010 Eriksen .................... H02K 9/10
310/63
(Continued)

FOREIGN PATENT DOCUMENTS

CN 102598479 A 7/2012
EP 2182619 A1 5/2010
(Continued)

OTHER PUBLICATIONS

International Search Report dated May 22, 2018 for Application No. PCT/EP2018/050526.
(Continued)

Primary Examiner — Jose A Gonzalez Quinones
(74) Attorney, Agent, or Firm — Schmeiser, Olsen & Watts LLP (57) ABSTRACT Provided a cooling arrangement for a generator including a stationary armature with an interior cavity bounded by an armature front plate, an armature back plate and a main shaft, which cooling arrangement includes a partition arranged to separate the interior cavity into an outer annular region adjacent to the armature and an inner annular region surrounding the main shaft, and wherein the partition includes a number of heat exchanger units; and a fan assembly arranged in the interior cavity to force hot air from the outer annular region through the heat exchanger units of the partition into the inner annular region and to expel cooled air from the inner annular region of the interior cavity. A wind turbine including such a cooling arrangement for cooling a generator and a method of cooling a generator is also provided.

12 Claims, 4 Drawing Sheets (51) Int. Cl.
*F03D 80/60* (2016.01)
*F03D 9/25* (2016.01)

(58) Field of Classification Search
USPC ........................................ 310/52, 54, 58, 64
See application file for complete search history.

(56) References Cited

U.S. PATENT DOCUMENTS

| 2010/0237727 | A1 | 9/2010 | Mantere |
| 2012/0217756 | A1 | 8/2012 | Balzer et al. |
| 2014/0346781 | A1* | 11/2014 | Airoldi ................ H02K 7/1838 |
| | | | 290/1 B |
| 2017/0074251 | A1* | 3/2017 | Airoldi .................. F03D 80/60 |

FOREIGN PATENT DOCUMENTS

| EP | 2234246 A1 | 9/2010 |
| JP | H0974717 A | 3/1997 |

OTHER PUBLICATIONS

Non-English Chinese Office Action dated Sep. 1, 2020 for Application No. 201880010097.0.

\* cited by examiner

COOLING ARRANGEMENT

CROSS-REFERENCE TO RELATED APPLICATIONS

This application claims priority to PCT Application No. PCT/EP2018/050526, having a filing date of Jan. 10, 2018, which is based on German Application No. 10 2017 201 641.8, having a filing date of Feb. 2, 2017, the entire contents both of which are hereby incorporated by reference.

FIELD OF TECHNOLOGY

The following describes a cooling arrangement for a generator; a wind turbine; and a method of cooling a generator.

BACKGROUND

A generator can comprise a stationary armature and a rotating field, or vice versa. An armature may be arranged within the field, or vice versa. In a generator such as a permanent magnet synchronous generator, the field—which carries the magnets is usually the rotor, and the armature—which carries the windings—is usually the stator. A wind turbine comprising such a generator may be realized as a direct-drive wind turbine, for which the rotating hub is mounted directly to the outer rotor. A number of rotor blades, usually three, are mounted to the hub, so that the outer rotor and hub rotate at the same speed.

During operation of a generator, the windings will become very hot because of the high currents that are induced in the windings. For a very large generator of the type being developed and installed for high power output wind turbines, increased generator capacity results in greater thermal losses, and the ensuing heat needs to be removed from the generator. Ineffective cooling of a generator can have a severe impact on its efficiency, and heat damage to the magnets may also result.

When the generator is installed in a wind turbine such as a direct-drive wind turbine, it is generally mounted around a stationary main shaft that extends from the hub into a canopy or nacelle and which may be used to mount the generator and hub on top of a tower. Particularly in the case of a direct-drive generator, the diameter of the armature is very large, and there is generally a large cavity or interior space between the armature and the main shaft. In a known approach to cooling a large generator, the armature is designed to allow a cooling airflow to pass over the hot windings and into the armature cavity through radial channels in the armature body. The hot air is cooled by several cooling units installed inside the armature cavity. Each individual cooling unit comprises a fan, a heat exchanger (or "cooler") with a cooling matrix, and two manifolds. A first manifold connects the fan to the heat exchanger, and a second manifold connects the fan to an end plate of the armature. During operation, the fan sucks air through the matrix of the heat exchanger (the matrix can be a dense arrangement of thin metal fins that absorb heat as air passes over them). The first manifold is fitted between the heat exchanger and the fan so that the fan can pull or draw air through the cooling matrix. The second manifold is generally fitted between the fan outlet and an armature end plate so that the cooled air can leave the armature and then find its way back into the air-gap to pass over the hot windings again. To cool a larger sized generator, the approach has generally been to simply install a higher number of such cooling units in the armature cavity.

However, the disadvantages of this approach are the relatively large number of fan motors required; the higher probability of leakages of fluid coolant from the heat exchangers; the number of manifolds required for the cooling units; and a significant drop in performance in the event of a fan failure. When a fan stops functioning for some reason, the cooler to which it is connected is also effectively unable to function, since the air is no longer being sucked through the cooling matrix. The cooling capacity of such an arrangement is quantified as the product $n \cdot U \cdot A$, where n is the number of (identical) cooling units, U is the heat transfer coefficient of a cooling unit, and A is the heat exchanger area of a cooling unit. Clearly, failure of one or more fans will significantly reduce the cooling capacity.

A further problem arises since the fans and the main shaft are exposed to hot air leaving the armature. When a fan is surrounded by hot air, thermal overload relay (TOR) may cause the fan motor to cut out upon reaching a too-high temperature. The temperature of the main shaft is of particular concern also because electrical components are usually installed in the relatively large space inside the shaft. Heat from the generator can reach the main shaft and heat the interior of the main shaft. High temperatures within the main shaft may result in having to shut down or down-regulate a generator to protect the electrical components from damage. Down-time and down-regulation result in loss of earnings to the wind turbine operator, and must therefore be taken seriously. For these reasons, in the known cooling arrangements it may be necessary to also provide a supply of low-temperature air for the electrical components within the main shaft. Furthermore, the space inside the main shaft is directly connected with the space inside the hub and also with the space inside the canopy or nacelle, where other electrical components are also usually installed. These components must also be protected from over-heating, and it may be necessary to provide additional cooling in the hub and canopy also. Therefore, the known cooling arrangements are generally associated with unfavourably high installation costs and running costs.

SUMMARY

An aspect relates to a more efficient way of cooling a generator of the type described above.

A generator of the type considered herein may be assumed to comprise a stationary armature with an interior cavity bounded by an armature front plate, an armature back plate and a main shaft. According to embodiments of the invention, the cooling arrangement comprises a partition arranged to separate the interior cavity into an outer annular region and an inner annular region. The outer annular region is adjacent to the armature so that the outer annular region is essentially bounded by the armature and the partition. The inner annular region is also essentially bounded by the partition and the main shaft. The partition thereby defines an outer annular region that is spatially separate or distinct from the inner annular region. In the inventive cooling arrangement, the partition incorporates a number of heat exchanger units, i.e. a heat exchanger unit is a structural element of the partition, and may be built into or set into the partition. The partition is therefore an essentially cylindrical element with a diameter that is less than the diameter of the armature, and greater than the diameter of the main shaft. The partition can be constructed to divide the armature interior cavity into two essentially equally-sized volumes, for example. Alternatively the dimensions and shape of the partition may be determined by the number and the dimensions of the heat exchanger units and the fans that are to be implemented in the cooling arrangement.

The inventive cooling arrangement further comprises a fan assembly arranged in the interior cavity to force hot air from the outer annular region through the heat exchanger units of the partition into the inner annular region and to expel cooled air from the inner annular region of the interior cavity. In other words, the fan assembly which can comprise any number of fans or fan units is arranged in the inner annular region in such a way as to draw hot air from the outer annular region through the heat exchanger units in the partition and to expel cooled air from the inner annular region of the stator interior cavity.

It shall be understood that a fan of the inventive cooling arrangement is not attached to a specific heat exchanger in the manner of the prior art approach described in the introduction. Instead, any fans of the fan assembly act collectively to draw the hot air from the outer annular region through the partition (where the hot air is cooled) and into the inner annular region, and the fans also act together in expelling the cooled air from the inner annular region.

An advantage of the cooling arrangement according to embodiments of the invention is that a significantly higher cooling capacity can be obtained compared to the prior art approach described above. For example, the heat exchange area can be increased without necessarily increasing the number of fans, since a fan is not "tied" to a heat exchanger. The inventive cooling arrangement makes it possible to increase the cooling capacity by using more heat exchangers, but without increasing the number of fans or the electrical consumption of the fans. A reduction in the number of fans may also be possible, while maintaining or even increasing the cooling capacity, thereby contributing to savings in the construction and running costs of the cooling arrangement. A further advantage of the inventive cooling arrangement is that the only effect of a fan failure is a slight reduction in flow rate, since a fan failure has no effect on the total heat exchanger area. Here, the cooling capacity can be quantified as the product $U \cdot nA$, where U is the total heat transfer coefficient of the cooling units, and nA is the total area of the cooling units. Clearly, failure of one or more fans will have an effect on the heat transfer coefficient U, but will have no effect on the area nA. Even if one fan should fail, the other fans will continue to draw the heated air through the coolers.

According to embodiments of the invention, the method of cooling a generator comprises the steps of arranging a partition to separate the armature interior cavity into an outer annular region adjacent to the stationary armature and an inner annular region surrounding the main shaft; arranging a number of heat exchanger units in the partition; and providing a fan assembly in the interior cavity to force hot air from the outer annular region through the heat exchanger units of the partition and into the inner annular region and to expel cooled air from the inner annular region of the interior cavity.

An advantage of the inventive method is that the fan motors are surrounded by cold air as they operate, thereby reducing the likelihood of overheating. This can advantageously reduce or completely eliminate the lost time due to thermal overload relay. Another advantage of the inventive method is that the cooling arrangement has no need for custom-shaped manifolds between the fans and the heat exchange units.

According to embodiments of the invention, the wind turbine has a generator of the type described above, and further comprises an embodiment of the inventive cooling arrangement for cooling the generator.

An advantage of the inventive wind turbine is that its main shaft inner surface is exposed to a lower air temperature, since it is exposed to air that has already been cooled on its way through the heat exchanger units in the partition. This results in correspondingly lower temperatures in the hub and canopy, and can eliminate the incidence of down-time arising from high temperatures in the hub.

Particularly advantageous embodiments and features of embodiments of the invention are given by the dependent claims, as revealed in the following description. Features of different claim categories may be combined as appropriate to give further embodiments not described herein.

In the following, it may be assumed that the generator is realized to comprise an outer rotor and an inner stator, and that the generator is installed around a stationary main shaft extending from the hub into a canopy to mount the generator and hub on top of a tower, as explained in the introduction. The terms "stator" and "armature" may be used interchangeably in the following. Similarly, the terms "rotor" and "field" may be used interchangeably. It may be assumed that the body of the stator comprises a plurality of radial cooling channels through which a cooling airflow, heated by the hot windings, can pass into the stator interior. The windings may be assumed to be arranged singly or pairwise in slots formed by between adjacent stator teeth. A radial cooling channel may be assumed to extend radially from the "floor" between two adjacent stator teeth, in the direction of the generator axis of rotation. The inside surface of the stator will therefore exhibit a corresponding number of slits or holes through which the heated air enters the stator interior.

In the inventive cooling arrangement, the interior cavity of the stator is divided into two spatially separate zones or regions by the partition that also incorporates a number of heat exchangers or coolers. In the following, the terms "heat exchanger unit", "heat exchanger" and "cooler" are synonymous and may also be used interchangeably. The partition extends between the stator front plate and the stator back plate, so that the outer zone (between stator and partition) is completely separated from the inner zone (between partition and main shaft). The partition can be realized in any number of ways. For example, the partition may comprise an essentially annular (polygonal, cylindrical etc.) framework that extends between the armature front plate and the armature back plate. The framework can be realized to hold a number of coolers in an essentially annular arrangement, so that each cooler presents a favourably large surface area towards the inside surface of the stator and the heated air from the radial cooling channels. In this embodiment, the partition effectively comprises the framework as well as the annular arrangement of coolers mounted in the framework.

Alternatively, in preferred embodiments of the invention, the partition can be realized to comprise a single heat exchanger unit that extends all the way around the main shaft. Such an essentially annular heat exchanger unit can extend between the stator end plates, and can be dimensioned to fit around the main shaft of one or more kinds of generator. The essentially annular heat exchanger unit can have a cylindrical shape or a polygonal shape, for example.

A heat exchanger unit of the inventive cooling arrangement is also part of a fluid cooling circuit of the generator. For example, a wind turbine may comprise a fluid cooling arrangement with an external air-cooled heat exchanger at the outside of the canopy, and a number of ducts or pipes that are arranged to pass through the external air-cooled heat exchanger and also to pass through the hotter areas of the wind turbine, for example close to or inside the generator. A fluid coolant can be pumped through the ducts and pipes, so that heated coolant is cooled again as it passes through the external air-cooled heat exchanger. This can be mounted at the rear end of the canopy, for example, in such a way to extend upwards into the wind passing over the canopy. A heat exchanger unit of the inventive cooling arrangement can be incorporated into such a fluid cooling circuit by arranging a coolant pipe to pass around or over the heat exchanger unit in such a way that the coolant in the pipe can absorb heat from the fins of the cooling matrix, which have absorbed heat from the hot air as it passes through the heat exchanger unit.

To ensure that the hot air is efficiently drawn away from the stator and cooled again, the inventive cooling arrangement comprises a fan assembly in the interior cavity, which forces the heated air through the coolers and into the inner annular region. The fan assembly also acts to expel the cooled air back outside the stator, so that it can re-enter the air-gap between stator and rotor to pass over the hot windings once again. The cooling airflow is essentially contained in the generator, being heated as it passes over the windings and into the upper region of the stator cavity, and being cooled again as it is pulled through the coolers in the partition and into the inner region of the stator cavity. The fan assembly can comprise any number of fans or fan units and is arranged in the inner region in such a way as to draw hot air from the outer region through the coolers in the partition and to expel the cooled air from the inner annular region of the interior cavity. To this end, in preferred embodiments of the invention, the cooling arrangement comprises a number of fans arranged to expel cooled air from the interior cavity through an opening in the stator front plate and/or a number of fans arranged to expel cooled air from the interior cavity through an opening in the stator back plate. The outlet of each fan may be formed in a stator end plate, so that the fan acts to blow or expel the cooled air out through the opening in the stator end plate. To ensure that the cooled air does not pass back into the inner region of the stator cavity, the fan assembly may be equipped with a non-return valve at the outlet of each fan unit. From there, the cooled air can find its way back into the air-gap. The fan assembly can achieve an underpressure in the outer region of the stator cavity and therefore also in the air-gap, so that the cooled air is effectively drawn back into the air-gap.

The cooling airflow can be effectively contained in this path by a front end cavity between the canopy and the stator front plate, and a rear end cavity between the canopy and the stator back plate. Of course, an arrangement is possible in which air from any other location can be drawn into the cooling air pathway of the stator. Measures are taken to ensure that only dry, clean air enters the generator in order to avoid moisture damage and corrosion.

In preferred embodiments of the invention, the effectiveness of the cooling arrangement may be improved by a seal arrangement between the partition and the stator end plates. For example, a suitable arrangement of gaskets may be used between the partition and the stator end plates in order to permit air flow only thorough the coolers. Such a seal arrangement can effectively prevent hot air i.e. air that has not been cooled from bypassing the coolers and entering the inner annular region. The seal arrangement effectively assists the hot air to pass through the partition and into the inner region of the stator cavity. Similarly, in further preferred embodiments of the invention, the cooling arrangement comprises a seal arrangement between adjacent heat exchanger units. Such seals act to prevent hot air from passing between adjacent heat exchanger units and into the inner region. Here also, the seal arrangement effectively forces the hot air to pass through the coolers on its way into the inner region of the stator cavity.

BRIEF DESCRIPTION

Some of the embodiments will be described in detail, with references to the following Figures, wherein like designations denote like members, wherein.

DETAILED DESCRIPTION

Figure 1:
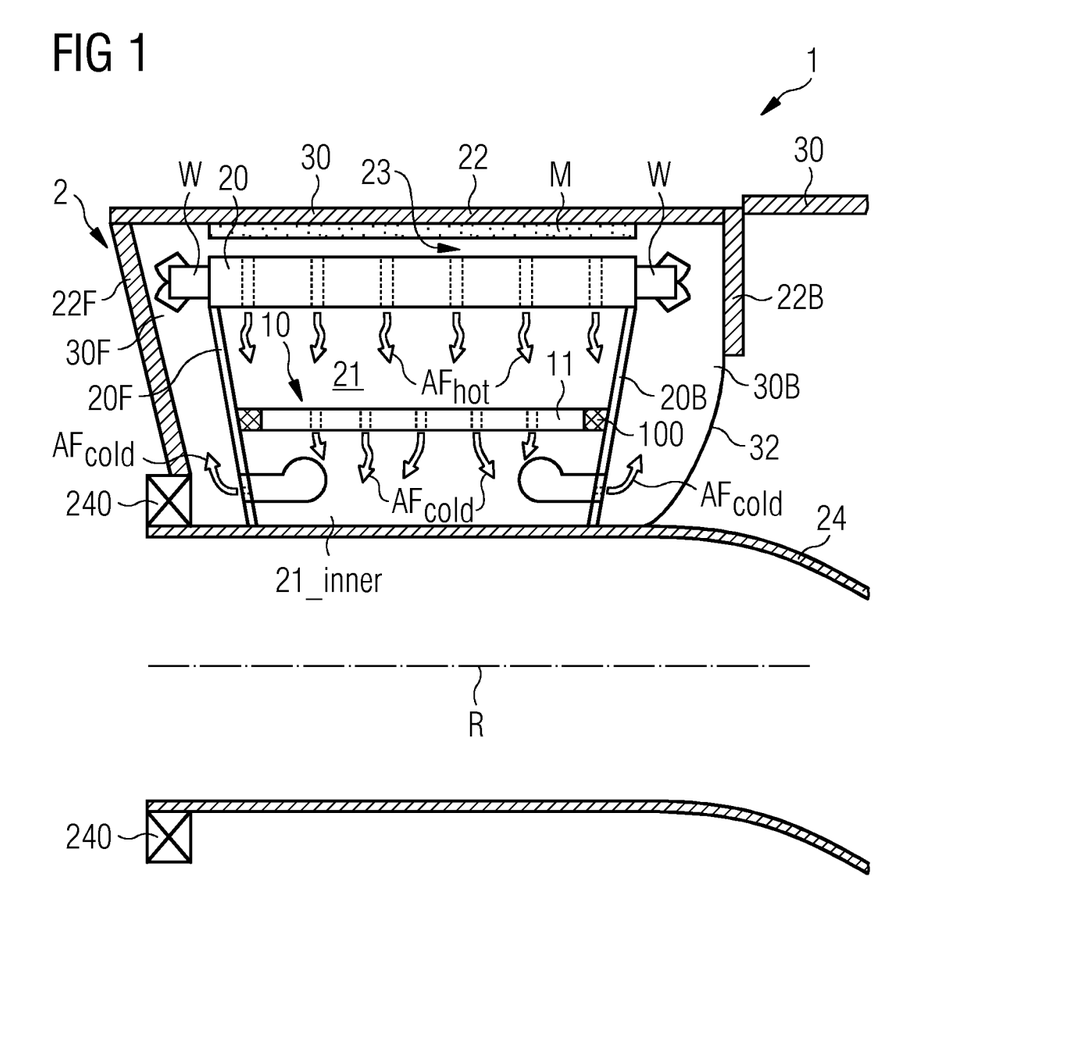
FIG. 1 shows a cooling arrangement in a generator of a wind turbine, in accordance with embodiments of the present invention.

FIG. 1 shows a generator 2 installed in a wind turbine. The generator 2 is a direct-drive generator 2 with an outer rotor 22 arranged to enclose an inner stator 20. The rotor 22 is supported by a rotor front plate 22F and a main bearing 240. A canopy 30 protects the generator 2 and other components from the exterior environment. A labyrinth seal between the stationary canopy 30 and a rotating brake disc 22B can keep moisture and air-borne particles outside.

Magnets M of the rotor 22 face windings W of the stator 20 across a narrow air-gap 23. End plates 20F, 20B mount the stator 20 about a main shaft 24. For clarity, the diagram only shows the upper half of the generator 2, which is installed to rotate about an axis R. An interior cavity 21 is bounded by the stator end plates 20F, 20B, the inside surface of the stator 20, and the main shaft 24. The cooling arrangement 1 uses a partition 10 to separate the stator interior cavity 21 into an outer annular region 21_outer and an inner annular region 21_inner. The outer annular region 21_outer is bounded by the armature 20 and the partition 10, while the inner annular region 21_inner is bounded by the partition 10 and the main shaft 24. These annular regions 21_outer, 21_inner are spatially separate or distinct. The partition 10 extends from the stator front plate 20F to the stator back plate 20B, and any gaps between the end plates 20F, 20B and the coolers 11 are closed using appropriate seals 100 or gaskets 100.

The partition 10 incorporates a number of heat exchanger units 11 or coolers 11 arranged to allow hot air $AF_{hot}$ to pass from the outer annular region 21_outer to the inner annular region 21_inner. Each cooler 11 can have a suitable cooling matrix with an arrangement of metal fins or other flat thermally conductive elements to maximise the surface area over which the hot air must pass. A fan assembly 12 arranged in the inner annular region 21_inner is configured to draw the hot air $AF_{hot}$ through the coolers 11 into the inner annular region 21_inner. As the airflow passes through the coolers 11, it is cooled so that a cooled airflow $AF_{cool}$ enters the inner annular region 21_inner. The fans 12 expel the cooled air $AF_{cool}$ from the interior cavity 21.

In this exemplary embodiment, the rotor front plate 22F and stator front plate 20F form a front end cavity 30F, and the stator back plate 20B, the brake disc 22B and a shield 32 form a rear end cavity 30B. The fans 12 expel the cooled air $AF_{cool}$ from the interior cavity 21 of the stator 20 into the front end cavity 30F and the rear end cavity 30B, from where the cooled air $AF_{cool}$ is able to re-enter the air-gap 23 and to pass over the hot windings W again, absorbing heat and re-entering the stator interior cavity 21 as a hot airflow $AF_{hot}$.

Figure 2:
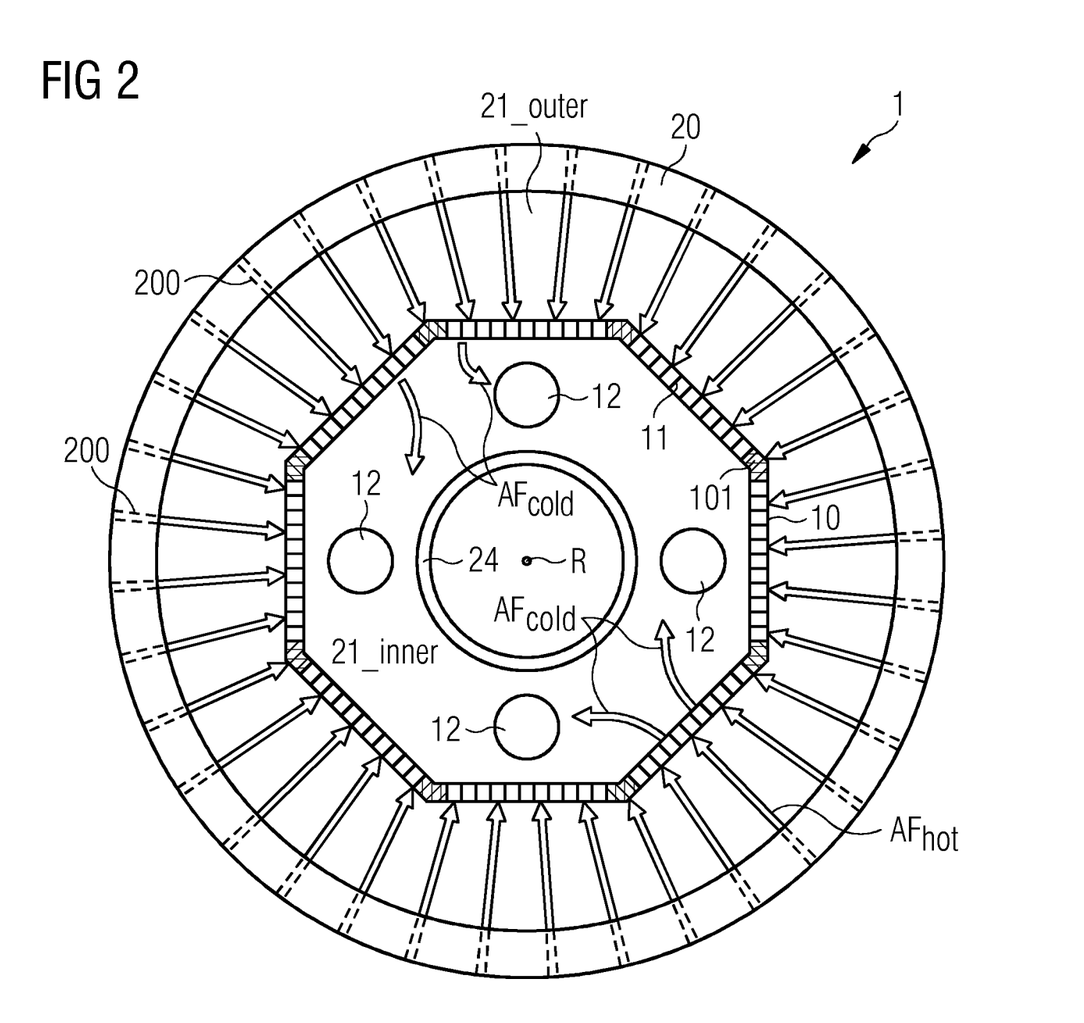
FIG. 2 shows the cooling arrangement of FIG. 1 in cross-section.

FIG. 2 shows the inventive cooling arrangement 1 in cross-section. The greatly simplified stator 20 does not show stator teeth, slots or windings, but these may be assumed. It may be assumed that there are several radial cooling channels 200 along each stator slot (i.e. between a pair of stator teeth), and it may be assumed that there are many such slots evenly distributed about the stator. The diagram shows the fans 12 of the fan assembly acting together to draw the hot air $AF_{hot}$ from the outer annular region 21_outer through the partition 10 and into the inner annular region 21_inner, and the fans 12 also act collectively in expelling the cooled air $AF_{cool}$ out of the inner annular region 21_inner. In this way, a favourably high cooling capacity can be achieved. If one of the fans should fail, the only effect would be a reduction in flow rate through the heat exchanger units 11, since failure of an individual fan has no effect on the total heat exchanger area. The diagram shows eight heat exchanger units 11 arranged in an octagonal arrangement. Gaps between the adjacent coolers 11 can be closed using appropriate seals 101. The diagram shows four fans 12 arranged in the inner annular region 21_inner. Two of these might blow air out into the front end cavity 30F, while the other two might blow air out into the rear end cavity 30B. Of course, any number of heat exchanger units 11 and fans 12 may be used, depending on the generator size, the size of the stator interior cavity 21, and the desired flow rate.

Figure 3:
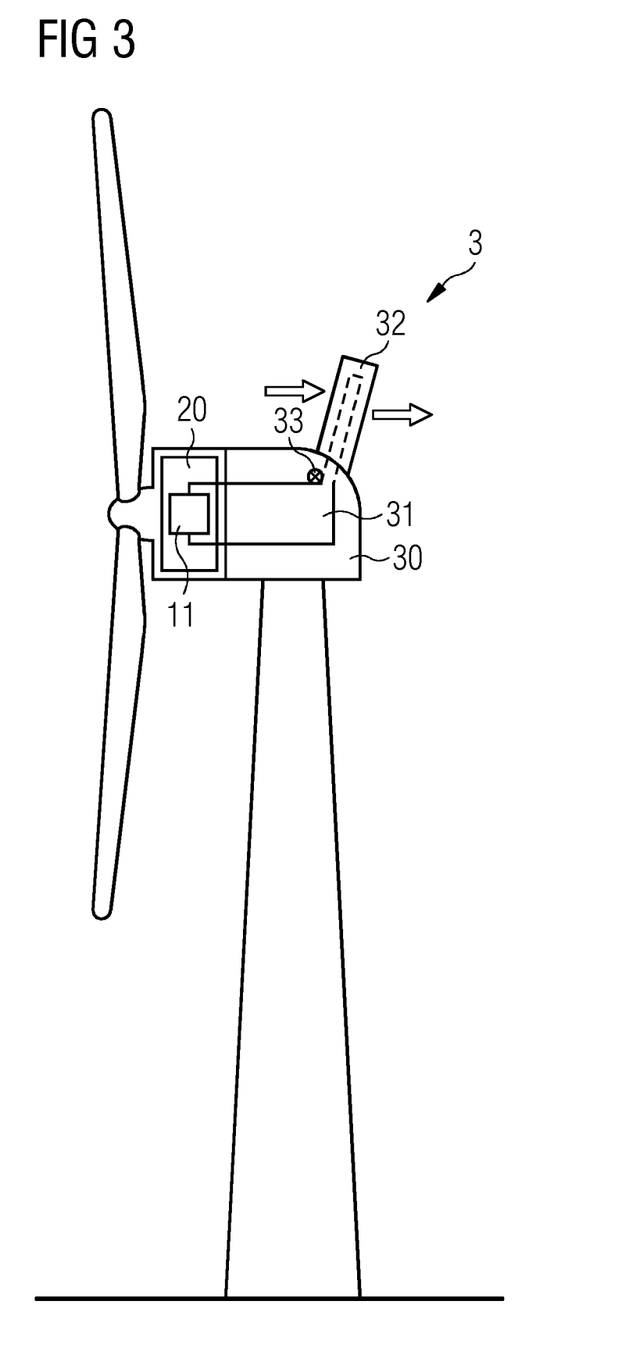
FIG. 3 shows a wind turbine, in accordance with embodiments of the present invention.

FIG. 3 indicates how the inventive cooling arrangement 1 may be incorporated into a fluid cooling circuit 31 of a wind turbine 3. Here, the wind turbine 3 is shown to have an external heat exchanger 32 arranged to sit in a cooling airflow (indicated by the arrows) passing over the canopy 30. Ducts or pipes form a circuit 31 between the external heat exchanger 32 and coolers 11 of the inventive cooling arrangement 1. For simplicity, the diagram only shows once such cooler 11. A duct with cold fluid coolant leads to the heat exchanger unit 11 of the inventive cooling arrangement 1. The hot airflow $AF_{hot}$ passing through the cooler 11 heats the fluid coolant, and a return duct conveys the heated coolant back to the external heat exchanger 32. One or more pumps 33 can ensure that the fluid coolant is moved sufficiently quickly through the circuit 31.

Figure 4:
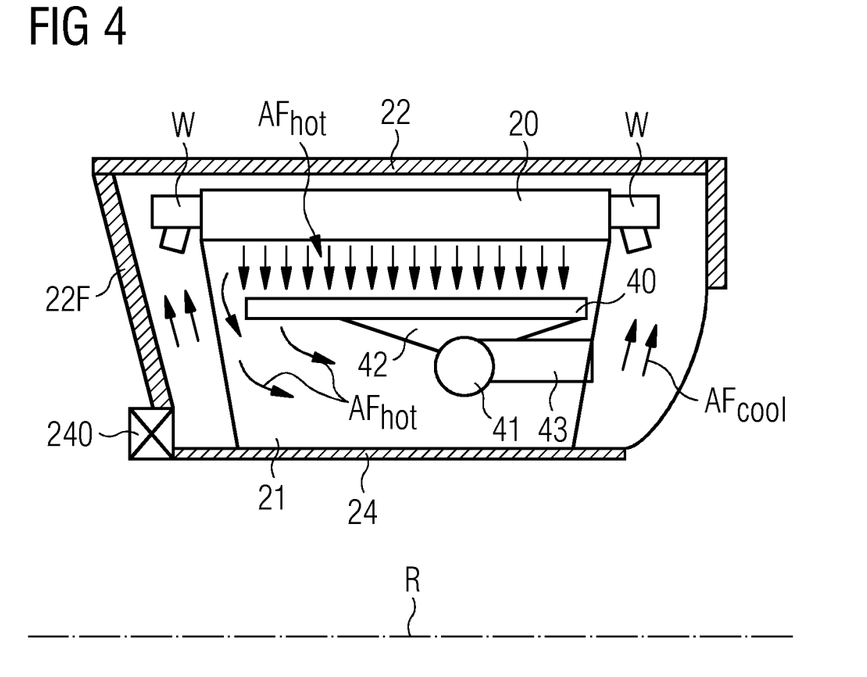
FIG. 4 shows a prior art cooling arrangement in a generator of a wind turbine.

FIG. 4 shows a prior art cooling arrangement for a direct-drive generator of a wind turbine. Here, the hot air $AF_{hot}$ coming from the stator 20 is cooled by a number of self-contained heat exchange modules. Each heat exchange module has a heat exchanger 40 arranged to present its entry face into the hot air flow $AF_{hot}$, and a manifold 42 that covers its exit face to guide the cooled air $AF_{cool}$ to a fan 41. The fan outlet is connected to a stator end face by a second manifold 43, so that the cooled air enters a cavity at the front end or rear end of the generator. If the fan 41 fails, this heat exchange module effectively ceases to operate and can make no further contribution to cooling the generator. Furthermore, the fan 41 must operate in a hot environment, since any portion of the hot air flow $AF_{hot}$ that is not taken up by the heat exchanger 40 will pass on towards the main shaft. The temperature in the region of the main shaft 24 and the fan 41 can easily reach 80° or more during operation of the wind turbine. The fan 41 may fail on account of thermal overload relay. The high temperature of the main shaft 24 can propagate into the hub, and may necessitate a temporary shut-down of the wind turbine for the reasons given in the introduction.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A cooling arrangement for a generator including a stationary armature with an interior cavity bounded by an armature front plate, an armature back plate and a main shaft, the cooling arrangement comprising:
   a partition arranged to separate the interior cavity into an outer annular region adjacent to the stationary armature and an inner annular region surrounding the main shaft, wherein the partition comprises a single annular heat exchanger unit;
   a plurality of fans arranged in the interior cavity to force hot air from the outer annular region through the single annular heat exchanger unit of the partition into the inner annular region and to expel cooled air from the inner annular region of the interior cavity through an opening in the armature front plate and/or to expel cooled air from the interior cavity through an opening in the armature back plate.

2. The cooling arrangement according to claim 1, wherein the partition extends from the armature front plate to the armature back plate.

3. The cooling arrangement according to claim 1, wherein a heat exchanger unit is part of a fluid cooling circuit.

4. The cooling arrangement according to claim 1, comprising a seal arrangement between the partition and the armature back plate and the armature front plate.

5. The cooling arrangement according to claim 1, comprising a seal arrangement between adjacent heat exchanger units.

6. A wind turbine with a generator including a stationary armature with an interior cavity bounded by an armature front plate, an armature back plate and a main shaft, the wind turbine comprising the cooling arrangement according to claim 1 for cooling the generator.

7. The wind turbine according to claim 6, comprising a canopy arranged to enclose the generator, a front end cavity between the canopy and the armature front plate and/or a rear end cavity between the canopy and the armature back plate, and wherein the cooling arrangement is arranged to expel cooled air into the front end cavity and/or into the rear end cavity.

8. The wind turbine according to claim 6, comprising a fluid cooling circuit connected to the single annular heat exchanger unit of the cooling arrangement.

9. The wind turbine according to claim 6, wherein the wind turbine is a direct-drive wind turbine, and the generator includes an outer field and an inner armature.

10. A method of cooling a generator including a stationary armature with an interior cavity bounded by an armature front plate, an armature back plate and a main shaft, the method comprising:
   arranging a partition to separate the interior cavity into an outer annular region adjacent to the stationary armature and an inner annular region surrounding the main shaft;

arranging a single annular heat exchanger unit in the partition; and providing a plurality of fans in the interior cavity to force hot air from the outer annular region through the heat exchanger units of the partition into the inner annular region and to expel cooled air from the inner annular region of the interior cavity through an opening in the armature front plate and/or to expel cooled air from the interior cavity through an opening in the armature back plate.

11. The method according to claim 10, comprising a step of arranging a non-return valve at an outlet of a fan unit.

12. The method according to claim 10, further comprising connecting the single annular heat exchanger unit to a fluid cooling circuit.

* * * * *